(12) United States Patent
Beisele

(10) Patent No.: US 6,489,405 B1
(45) Date of Patent: Dec. 3, 2002

(54) EPOXY RESIN FORMULATION CONTAINING EPOXY GROUP-TERMINATED POLYESTERS

(75) Inventor: Christian Beisele, Basel (CH)

(73) Assignee: Vantico, Inc., Brewster, NY (US)

( * ) Notice: Subject to any disclaimer, the term of this patent is extended or adjusted under 35 U.S.C. 154(b) by 1078 days.

(21) Appl. No.: 08/573,767

(22) Filed: Dec. 18, 1995

(30) Foreign Application Priority Data

Dec. 22, 1994 (CH) ................................................ 3897/94

(51) Int. Cl.[7] ................................................ C08F 20/00
(52) U.S. Cl. ........................ 525/438; 525/423; 525/524; 525/532; 525/533; 525/540; 528/93; 528/103; 528/103.5; 528/111; 528/111.3; 528/111.5; 528/113; 428/413
(58) Field of Search ................................. 525/438, 423, 525/524, 532, 533, 540; 528/93, 103, 103.5, 111, 111.3, 111.5, 113; 428/413

(56) References Cited

U.S. PATENT DOCUMENTS

| 3,027,279 | A | * | 3/1962 | Kurka et al. ................. 528/297 |
| 3,299,169 | A |   | 1/1967 | Smith .......................... 260/830 |
| 3,816,365 | A | * | 6/1974 | Schmid et al. ............. 528/111.3 |
| 3,929,717 | A |   | 12/1975 | Lee .............................. 260/37 |
| 3,943,104 | A | * | 3/1976 | Waddill ........................ 528/94 |
| 3,985,825 | A | * | 10/1976 | Schmid et al. ............... 525/438 |
| 4,195,153 | A | * | 3/1980 | Waddill ........................ 528/94 |
| 4,423,170 | A | * | 12/1983 | Waddill ........................ 528/98 |
| 4,485,229 | A | * | 11/1984 | Waddill et al. .............. 525/504 |
| 4,507,363 | A | * | 3/1985 | Chow et al. ................. 528/111 |
| 4,528,308 | A | * | 7/1985 | Waddill ........................ 525/113 |
| 4,554,297 | A | * | 11/1985 | Dabi ........................... 525/523 |
| 4,800,222 | A | * | 1/1989 | Waddill ........................ 528/94 |
| 4,866,108 | A |   | 9/1989 | Vachon et al. ............... 523/428 |
| 4,952,645 | A | * | 8/1990 | Mulhaupt et al. ........ 528/111.3 |

FOREIGN PATENT DOCUMENTS

| EP | 1311553 | * | 3/1973 |
| FR | 2017871 |   | 5/1970 |

* cited by examiner

Primary Examiner—Randy Gulakowski
(74) Attorney, Agent, or Firm—Proskauer Rose LLP; Kristin H. Neuman, Esq.

(57) ABSTRACT

A curable epoxy resin formulation comprising a) 40 to 100% by weight of an epoxy group-terminated polyester of a dimerised or trimerised fatty acid and a polyhydric alcohol, and 0 to 60% by weight of a diepoxide which is not an epoxy group-terminated polyester, b) a hardener for epoxy resins consisting of 50 to 99% by weight of a polyoxyalkylene di- or triamine and 1 to 50% by weight of a hardener which is not a polyoxyalkyleneamine, and comprising as further optional components c) a curing accelerator, and d) customary modifiers for epoxy casting resins, with the proviso that the sum of the constituents in component a) as well as in component b) is in each case 100% by weight, is suitable for use as casting resin formulation for encapsulating electrical or electronic components.

10 Claims, No Drawings

EPOXY RESIN FORMULATION CONTAINING EPOXY GROUP-TERMINATED POLYESTERS

The present invention relates to a curable epoxy resin formulation containing specific long-chain epoxy group-terminated polyesters and polyalkylene di- and triamines, and to the use thereof for encapsulating electrical and electronic components.

Curable epoxy resin formulations which may be used as casting resin materials for encapsulating electrical and electronic components are known in the art. Exacting demands are made of such encapsulating materials, in particular with respect to heat ageing and to flexibility at different temperatures.

In U.S. Pat. No. 3,299,169 there is disclosed a flexible epoxy resin formulation in which the diglycidyl ether of a diphenol is modified with a diglycidyl ether of a polyalkylene glycol, and a low molecular weight polyoxyalkylenediamine is used as hardener. The mouldings fabricated from such epoxy resin formulations have only comparatively low flexibility.

In U.S. Pat. No. 3,929,717 there is likewise disclosed an encapsulating formulation consisting of a diglycidyl ether of a diphenol, a diglycidyl ether of a polyalkylene glycol and a polyoxyalkylenediamine, which formulation additionally comprises primary or secondary aryl- or alkanolamines for enhancing the solubility of the encapsulating formulation in alcohol. The mouldings obtained from these epoxy resin formulations are of comparatively low flexibility.

In U.S. Pat. No. 4,866,108 there are disclosed adhesive formualtions based on the diglycidyl ester of dimerised linoleic acid and an adduct of 2 mol of the diglycidyl ether of bisphenol A and 1 mol of dimerised linoleic acid, and which additionally comprise plasticisers. In these formulations polyesters based on linoleic acid are neither used nor in any way made obvious to those skilled in the art.

It has now been found that it is possible to obtain flexible mouldings which are based on modified epoxy resins and which retain their flexibility over a wide temperature range, especially at low temperatures, and which also meet exacting demands made of ageing resistance, by using as epoxy resin an epoxy group-terminated polyester of a dimerised or trimerised fatty acid and a polyhydric alcohol and, as hardener for the epoxy resin, a mixture of a polyoxyalkylene di- or triamine and a hardener which is not a polyoxyalkyleneamine.

Accordingly, the invention relates to a curable epoxy resin formulation which comprises
a) 40 to 100% by weight of an epoxy group-terminated polyester of a dimerised or trimerised fatty acid and a polyhydric alcohol, and 0 to 60% by weight of a diepoxide which is not an epoxy group-terminated polyester,
b) a hardener for epoxy resins consisting of 50 to 99% by weight of a polyoxyalkylene di- or triamine and 1 to 50% by weight of a hardener which is not a polyoxyalkyleneamine, and comprising as further optional components
c) a curing accelerator, and
d) customary modifiers for epoxy casting resins, with the proviso that the sum of the constituents in component a) as well as in component b) is in each case 100% by weight.

Component a) of the novel epoxy resin formulations constitutes a known class of compounds and embraces the adducts of diepoxides with carboxyl-terminated polyesters. Such adducts based on diglycidyl compounds and carboxyl-terminated polyesters of dimerised monomeric unsaturated fatty acid and alkane diols and the preparation thereof are disclosed, inter alia, in U.S. Pat. No. 3,816,365. Epoxy group-containing adducts of cycloaliphatic diepoxides which contain at least one one 1,2-epoxy group located at a 5- or 6-membered carbocyclic ring, typically bis(2,3-epoxycyclopentyl) ether, 2,3-epoxy-cyclopentylglycidyl ether, 1,2-bis(2,3-epoxycyclopentyloxy)ethane or 3,4-epoxy-cyclohexylmethyl-3',4'-epoxycyclohexanecarboxylate, and the carboxyl-terminated polyesters of dimerised monomeric unsaturated fatty acid and alkanediols, as well as the preparation thereof, are more fully disclosed in U.S. Pat. No. 3,642,674. These epoxy group-containing adducts may usually be prepared by reacting 1 mol of the carboxyl group-terminated polyester with 2 mol of the diepoxide at elevated temperature.

Component a) of the the epoxy resin formulations of this invention is preferably an epoxy group-containing adduct of a diglycidyl compound and a carboxyl-terminated polyester of formula I

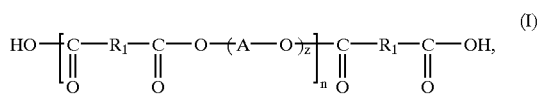

(I)

wherein
$R_1$ is the hydrocarbon radical of an unsaturated or a saturated aliphatic-cycloaliphatic dicarboxylic acid obtained by dimerisation of an unsaturated monomeric fatty acid containing 14 to 24, preferably 16 to 18, carbon atoms, in the molecule, and optional subsequent hydrogenation of such a dimerised fatty acid,
A is a straight-chain or branched alkylene radical of 2 to 18 carbon atoms,
z is 1 or 2, and
n is an integer from 1 to 20, preferably from 2 to 6.

Diglycidyl compounds suitable for the preparation of the epoxy group-containing adducts are the standard epoxy resins of epoxy resin technology. Typical examples of epoxy resins are:

I) Polyglycidyl and poly($\beta$-methylglycidyl)esters which are obtainable by reacting a compound containing at least two carboxyl groups in the molecule and epichlorohydrin or $\beta$-methylepichlorohydrin. The reaction is conveniently carried out in the presence of a base.

Compounds containing at least two carboxyl groups in the molecule may suitably be aliphatic polycarboxylic acids. Examples of such polycarboxylic acids are oxalic acid, succinic acid, glutaric acid, adipic acid, pimelic acid, sebacic acid, suberic acid, azelaic acid or dimerised or trimerised linoleic acid. It is, however, also possible to use cycloaliphatic polycarboxylic acids such as tetrahydrophthalic acid, 4-methyltetrahydrophthalic acid, hexahydrophthalic acid or 4-methylhexahydrophthalic acid. Aromatic polycarboxylic acids can also be used, typically phthalic acid, isophthalic acid and terephthalic acid.

II) Polyglycidyl or poly($\beta$-methylglycidyl)ethers which are obtainable by reacting a compound containing at least two free alcoholic hydroxyl groups and/or phenolic hydroxyl groups and epichlorohydrin or $\beta$-methylepichlorohydrin, under alkaline conditions or in the presence of an acid catalyst and subsequent treatment with an alkali.

The glycidyl ethers of this type are typically derived from acyclic alcohols, typically from ethylene glycol, diethylene glycol and higher poly(oxyethylene)glycols, 1,2-propanediol or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylol-propane, pentaerythritol, sorbitol, as well as from polyepichlorohydrins. They may also be derived from cycloaliphatic alcohols such as 1,4-cyclohexanedimethanol, bis(4-hydroxy-cyclohexyl)methane or 2,2-bis(4-hydroxycyclohexyl)propane, or they contain aromatic nuclei such as N,N-bis(2-hydroxyethyl) aniline or p,p'-bis(2-hydroxyethylamino)diphenyl-methane.

The glycidyl ethers may also be derived from mononuclear phenols, typically from resorcinol or hydroquinone, or they are derived from polynuclear phenols such as bis(4-hydroxyphenyl)methane, 4,4'-dihydroxybiphenyl, bis (4-hydroxyphenyl)sulfone, 1,1,2,2-tetrakis (4-hydroxyphenyl)ethane, 2,2-bis(4-hydroxyphenyl)propane, 2,2-bis(3,5-dibromo-4-hydroxyphenyl)propane, as well as from novolaks obtainable by condensation of aldehydes such as formaldehyde, acetaldehyde, chloral or furfuraldehyde, with phenols such as phenol, or with phenols which are substituted in the nucleus by chlorine atoms or $C_1$–$C_9$alkyl groups, for example 4-chlorophenol, 2-methylphenol or 4-tert-butylphenol, or by condensation with bisphenols of the type cited above.

III) Poly-(N-glycidyl) compounds obtainable by dehydrochlorination of the reaction products of epichlorohydrin with amines which contain at least two amino hydrogen atoms. These amines are typically aniline, n-butylamine, bis(4-aminophenyl)methane, m-xylylenediamine or bis(4-methylaminophenyl)methane. The poly(N-glycidyl) compounds also include triglycidyl isocyanurate, N,N'-diglycidyl derivatives of cycloalkylene ureas such as ethylene urea or 1,3-propyleneurea, and diglycidyl derivatives of hydantoins, typically of 5,5-dimethylhydantoin.

It is also possible to use epoxy resins in which the 1,2-epoxy groups are attached to different hetero atoms or functional groups. These compounds typically comprise the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis (5,5-dimethyl-1-glycidylhydantoin-3-yl) propane.

The aforementioned epoxy compounds are known and some are commercially available.

The diglycidyl compound in the adducts to be used in the practice of this invention is preferably a diglycidyl ether of a dihydric phenol and an aliphatic diol, conveniently the diglycidyl ether of butanediol or a diglycidyl ether of polyoxypropylene.

The aliphatic-cycloaliphatic dicarboxylic acids used for the preparation of the carboxyl group-terminated polyesters of formula I are obtained by dimerisation of monomeric fatty acids having sufficiently functional double bonds and of fatty acids derived from drying or semi-drying oils.

Such monomeric fatty acids are suitably those containing 14 to 24, preferably 16 to 18, carbon atoms in the molecule, and having at least one reactive double bond in the molecule, typically oleic acid, linoleic acid, linolenic acid, ricinenic acid as well as hydroxyl group-containing fatty acids such as ricinoleic acid.

Suitable drying or semi-drying oils from which such fatty acids are derved are typically: cotton seed oil, colza oil, safflor oil, sesame oil, sunflower oil, soybean oil, tung oil, linseed oil, oiticia oil and perilla oil.

In the known dimerisation methods of preparing the aliphatic-cycloaliphatic dicarboxylic acids, the fatty acids which contain mainly only one double bond in the molecule usually react to form an acid mixture which consists preponderantly of dimeric, and to a lesser extent also of trimeric or higher molecular, fractions. In the dimerisation process, a larger amount of trimerised or polymerised fatty acids is obtained from fatty acids containing more than one double bond in the molecule. The monomeric, insufficiently functional acids are removed from the reaction mixture by distillation.

The aliphatic-cycloaliphatic dicarboxylic acids obtained by dimerisation and which are to some degree saturated can be used direct or after hydrogenation for the preparation of the carboxyl group-terminated polyesters.

Diols of formula II

$$\text{HO}\!-\!(\text{A}\!-\!\text{O})\!_z\!\text{H} \qquad (\text{II}),$$

wherein A and z are as defined for formula I, the use of which is preferred for the preparation of the carboxyl group-terminated polyesters, are in particular: ethylene glycol, diethylene glycol, 1,2-propanediol, 1,3-propanediol, dipropylene glycol, 1,4-butanediol, 2,3-butanediol, 1,5-pentanediol, neopentyl glycol, 1,6-hexanediol, 1,8-octanediol, 1,10-decanediol, 1,12-dodecanediol, 1,6-dihydroxy,2,2,4-trimethylhexane and 1,6-dihydroxy-2,4,4-trimethylhexane.

It is, of course, also possible to use mixtures of the above diols as well as mixtures of the dimerised fatty acids for the preparation of the carboxyl group-terminated polyesters of formula I.

It is furthermore also possible to use small amounts of trivalent or polyvalent components such as hexanetriol, trimerised fatty acid, tri- or tetracarboxylic acid or the anhydrides thereof, typically trimellitic anhydride or pyromellitic anhydride, for the preparation of the carboxyl group-terminated polyesters.

The epoxy group-containing adducts are usually prepared by simple fusing of the polyepoxide with the carboxyl group-containing polyester of formula I in the prescribed stoichiometric amounts. It is preferred to use an excess of polyepoxide to obtain a mixture of the epoxy group-containing adduct and the polyepoxide. The process is normally carried out in the temperature range from 100 to 200° C., preferably from 130 to 180° C.

Suitable diepoxides which are not epoxy group-terminated polyesters are the standard epoxy resins of epoxy resin technology such as the epoxy resins referred to above used for the preparation of the epoxy group-containing adducts.

The polyoxyalkylene di- and triamines used as component b) in the epoxy resin formulations of this invention are known and some are commercially available. Preferred polyoxyalkylene diamines for the purpose of the invention are compounds of formula III or IV

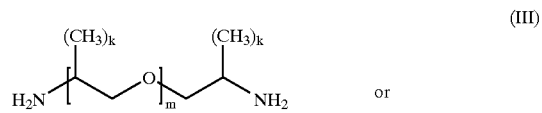

(III)

or

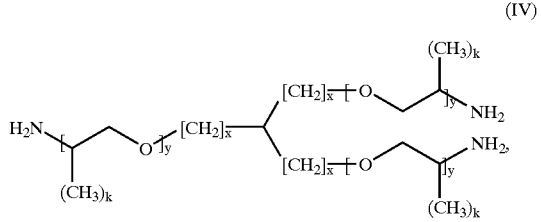

(IV)

wherein the indices k are each independently of one another 0 or 1, m is an integer from 6 to 70, the indices x are each independently of one another 0 or 1 and the indices y are each independently of one another an integer from 2 to 50.

Long polyoxyalkylene chains in the above polyamines may also be branched and thus contain more than 2 or 3 amino groups in the molecule.

Specific polyoxyalkyleneamines of the above formula are commercially available from Texaco Chemical Co. under the registered trademark Jeffamines®.

The epoxy resin formulations of this invention preferably contain as polyoxyalkyleneamine a polyoxypropylenediamine or a polyoxyethylenediamine, more particularly a poly-oxypropylenediamine of formula V

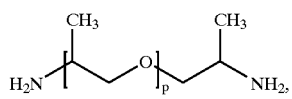

(V)

wherein p is an integer from 6 to 40.

The hardener of component b) which is not a polyoxyalkyleneamine may in principle be any standard hardener for epoxy resins that does not react with the polyoxyalkyleneamines, and is typically selected from dicyandiamide, polyamines and polyols.

Polyamines suitable for curing the novel curable epoxy resin casting formulations are aliphatic, cycloaliphatic, aromatic or heterocyclic amines, including ethylenediamine, 1,2-propanediamine, 1,3-propanediamine, N,N-diethylethylenediamine, hexamethylenediamine, diethylenetriamine, triethylenetetramine, tetraethylenepentamine, N-(2-hydroxyethyl)amine, N-(2-hydroxypropyl)amine and N-(2-cyanoethyl)diethyltriamine, 2,2,4-trimethyl-1,6-hexanediamine, 2,3,3,-trimethyl-1,6-hexanediamine, N,N-dimethyl- and N,N-diethyl-1,3-propanediamine, ethanolamine, m- and p-phenylenediamine, bis(4-aminophenyl)methane, aniline-formaldehyde resin, bis(4-aminophenyl)sulfone, m-xylylenediamine, bis(4-aminocyclohexyl)methane, 2,2-bis(4-aminocyclohexyl)propane, 2,2-bis(4-amino-3-methylcyclohexyl)propane, 3-aminomethyl-3,5,5-trimethyl-cyclohexylamine (isophoronediamine) and N-(2-aminoethyl)piperazine, and, as polyaminoamides, typically those from aliphatic polyamines and dimerised or trimerised fatty acids, and also polyamines of formula

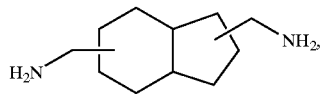

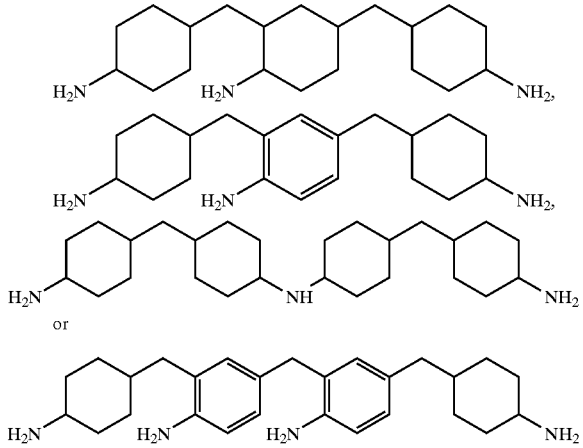

as well as mixtures of these amino compounds.

Polyamines which are suitable for use in the curable epoxy resin formulations of this invention may also be the amino group-containing adducts obtained in known manner by addition of amines to polyepoxides or the amino group-terminated polyamides which are also known compounds.

Aliphatic polyols suitable for the novel curable epoxy resin compositions of this invention are typically ethylene glycol, diethylene glycol and higher poly(oxyethylene) glycols, 1,2-propanediol or poly(oxypropylene)glycols, 1,3-propanediol, 1,4-butanediol, poly(oxy-tetramethylene) glycols, 1,5-pentanediol, 1,6-hexanediol, 2,4,6-hexanetriol, glycerol, 1,1,1-trimethylolpropane, pentaerythritol or sorbitol.

Aromatic polyols suitable for curing the novel epoxy resin casting compositions include mononuclear phenols such as resorcinol, hydroquinone, N,N-bis(2-hydroxyethyl)aniline, or polynuclear phenols, such as p,p'-bis(2-hydroxyethylamino)diphenylmethane, bis(4-hydroxyphenyl) methane, 4,4'-dihydroxybiphenyl, bis(4-hydroxyphenyl) sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, as well as novolaks obtainable by condensation of aldehydes, typically formaldehyde, acetaldehyde, chloral or furfuraldehyde, with phenols such as phenol, or with phenols which are substituted in the nucleus by chlorine atoms or $C_1$–$C_9$alkyl groups, for example 4-chlorophenol, 2-methylphenol, or 4-tert-butylphenol, or by condensation with bisphenols, such as those of the indicated type.

If desired, the epoxy resin formulations may also contain suitable curing accelerators. Tertiary amines or salts thereof, quaternary ammonium compounds or alkali metal oxides may conveniently be added as accelerators when using dicyandiamide, polyaminoamides, polycarboxylic acids and their anhydrides.

The amount of hardener b) will depend on the chemical nature of the hardener and on the desired properties of the curable formulation and the hardened product. The maximum amount can be readily determined. If the hardening agent is an amine, the amount used is normally 0.75 to 1.25 equivalents of active hydrogen bound to amino nitrogen atoms per 1 epoxide equivalent. If the hardener is a polycarboxylic acid or an anhydride thereof, the amount used is normally 0.4 to 1.1 equivalents of carboxyl group or anhydride group per 1 epoxide equivalent. If the hardener is a polyphenol, the amount used is 0.75 to 1.25 phenolic hydroxyl groups per 1 epoxide equivalent. Catalytic hardeners are usually used in amounts of 1 to 40 parts by weight per 100 parts by weight of epoxy resin.

If desired, the modifiers conventionally used in epoxy resin technology may also be added to the epoxy resin formulations of this invention. Such modifiers typically include fillers such as glass or metal powders, mineral fillers such as $Al_2O_3.nH_2O$, silicates, calcite, dolomite or quartz, dyes, pigments such as titanium dioxide or carbon black, processing auxiliaries, including lubricants, flow control agents, thixotropic agents, stabilisers, flame retardants, adhesion promoters between fillers and resin or mould release agents.

The amount of standard modifiers to be added to the novel epoxy resin formulations will depend on the specific end use of said formulations.

The novel formulations are prepared by per se known methods, typically using known mixing aggregates such as stirrers, kneaders or roll mills.

The cure of the novel formulations to moulded articles, coatings or the like is carried out in the conventional manner described, inter alia, in the "Handbook of Epoxy Resins", 1967, by H. Lee and K. Neville. The cure temperature will usually be in the range from 50 to 200° C., preferably from 80 to 130° C.

The novel formulations are suitable for use as laminating resins or coating compositions, preferably as casting resins as well as, in particular, as encapsulating systems for electrical and electronic components, especially those subjected to alternating temperatures. As mentioned at the outset, the mouldings and coatings fabricated from the curable epoxy resin formulations of this invention have good flexibility over a relatively wide temperature range, especially at low temperatures.

The invention therefore also relates to the use of the novel epoxy resin formulations as casting resins for encapsulating electrical and electronic components.

Epoxy resin A: 1040 g of a dimerised fatty acid having an average molecular weight ($\overline{M}_w$) of c. 600 (Pripol® 1022, ex Unichema) and 144 g of diethylene glycol are heated, with stirring and under nitrogen, to 100° C. After addition of 0.64 g of potassium carbonate, the reaction mixture is evacuated to 25 torr and the water of reaction is removed by distillation. The reaction mixture is heated to 155° C. and kept for 3 h at 155° C./25 torr. After cooling to 60° C., 800 g of the diglycidyl ether of bisphenol A, 324 g of the diglycidyl ether of butanediol and 0.4 g of a 30% solution of sodium ethanolate in methanol is added. The reaction mixture is kept first for 30 minutes (min) at 100° C. and then for 2 h at 145° C. Then a further 120 g of diglycidyl ether of bisphenol A and 130 g of diglycidyl ether of polypropylene glycol having an average molecular weight $\overline{M}_w$ of 400 are added to the reaction mixture, which is subsequently heated for 1 h at 110° C. After cooling, the reaction product is filtered to give an epoxy group-terminated polyester having an epoxy equivalent of 360.

EXAMPLE 475 g of a polyoxypropylenediamine having a $\overline{M}_w$ of 2000, commercially available under the registered trademark Jeffamin® D 2000 (ex Texaco), and 25 g of diethylenetriamine are weighed into a round-bottomed flask. The mixture is then stirred vigorously for 15 min. The liquid so obtained has an amino equivalent of 220. 60 parts by weight of this epoxy hardener are mixed with 100 parts by weight of epoxy resin A and the mixture is cured for 3 hours (h) at 80° C. The resultant mouldings are tested for the following properties:

| | |
|---|---|
| $T_g$ DSC*) TA 4000 (Mettler) | = −50° C. |
| elongation at 23° C. | = (ISO R 527) = 42% |
| at −40° C. (ISO R 527) | = 150% |
| Shore hardness A (DIN 53505) | = 45 |
| thermal ageing (300 h/125° C.): | |
| $T_g$ | = −47° C. |
| weight loss | = 1.7% |
| Shore hardness A | = 47. |
| *) differential scanning calorimeter | |

USE EXAMPLE 100 g of epoxy resin A and 60 g of the liquid hardener of the above Example are heated separately to 60° C. During the subsequent blending with a dynamic mixer, the casting resin formulation so obtained is degassed at 1 mbar and then used for encapsulating an electrical component, viz. an ignition device for lamps. The casting resin formulation is cured for 6 h at 60° C. The encapsulated component withstands the following alternating temperature test: alternating temperature test: 2 h/−40° C ⇌ 2 h/125° C; number of cycles: 30.

What is claimed is:

1. A curable epoxy resin formulation comprising
    a) 40 to 100% by weight of an epoxy group-terminated polyester of a dimerised or trimerised fatty acid and a polyhydric alcohol, and 0 to 60% by weight of a diepoxide which is not an epoxy group-terminated polyester,
    b) a hardener for epoxy resins consisting of 50 to 99% by weight of a polyoxyalkylene di- or triamine and 1 to 50% by weight of a hardener which is not a polyoxyalkyleneamine, and comprising as further optional components
    c) a curing accelerator, and
    d) customary modifiers for epoxy casting resins, with the proviso that the sum of the constituents in component a) as well as in component b) is in each case 100% by weight.

2. An epoxy resin formulation according to claim 1, wherein component a) is an epoxy group-containing adduct of a diglycidyl compound and a carboxyl-terminated polyester of formula I

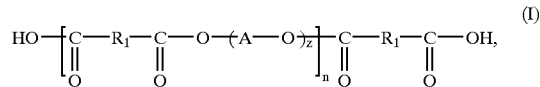

wherein
    $R_1$ is the hydrocarbon radical of an unsaturated or a saturated aliphatic-cycloaliphatic dicarboxylic acid obtained by dimerisation of an unsaturated monomeric fatty acid containing 14 to 24, carbon atoms, in the molecule, and optional subsequent hydrogenation of such a dimerised fatty acid,
    A is a straight-chain or branched alkylene radical of 2 to 18 carbon atoms,
    z is 1 or 2, and
    n is an integer from 1 to 20.

3. An epoxy resin formulation according to claim 2, wherein component a) is an epoxy group-containing adduct of a digylcidyl compound and a carboxyl group-terminated polyester of formula I wherein $R_1$ is the hydrocarbon radical of an unsaturated or a saturated aliphatic-cycloaliphatic dicarboxylic acid obtained by dimerisation of an unsaturated monomeric fatty acid containing 16 to 18 carbon atoms.

4. An epoxy resin formulation according to claim 2, wherein component a) is an epoxy group-containing adduct of a diglycidyl compound of a dihydric phenol and a carboxyl group-terminated polyester of formula I.

5. An epoxy resin formulation according to claim 1, wherein the polyoxyalkylene b) is a compound of formula III or IV

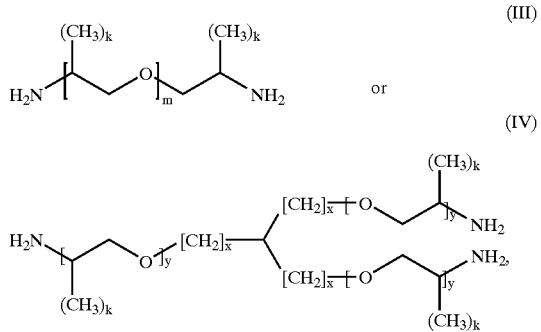

wherein the indices k are each independently of one another 0 or 1, m is an integer from 6 to 70, the indices x are each independently of one another 0 or 1 and the indices y are each independently of one another an integer from 2 to 50.

6. An epoxy resin formulation according to claim 1, wherein the polyoxyalkyleneamine b) is a polyoxypropylenediamine of formula V

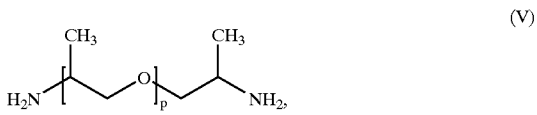

wherein p is an integer from 6 to 40.

7. An epoxy resin formulation according to claim 1, wherein the hardener b) which is not a polyoxyalkyleneamine is selected from the group consisting of dicyandiamide, polyamine and a polyol.

8. A casting resin formulation consisting of a curable epoxy resin formulation as claimed in claim 1.

9. A casting resin formulation consisting of a curable epoxy resin formulation as claimed in claim 1 for encapsulating electrical or electronic components.

10. An epoxy resin formulation according to claim 1 wherein n is from 2 to 6.

* * * * *